United States Patent Office 2,889,324
Patented June 2, 1959

2,889,324

N.N'-(PHENYL-MALONYL)-DIHYDRO-BENZO[C] CINNOLINE

Rudolf Pfister and Franz Häfliger, Basel, Switzerland, assignors, by mesne assignments, to Geigy Chemical Corporation, New York, N.Y., a corporation of Delaware No Drawing. Application February 13, 1956
Serial No. 564,868

Claims priority, application Switzerland
February 16, 1955

1 Claim. (Cl. 260—250)

The present invention is concerned with therapeutically valuable N.N'-(phenyl-malonyl)-dihydro-benzo[c]cinnoline.

It has been found that N.N'-phenyl-malonyl-dihydro-benzo[c]cinnoline of the formula:

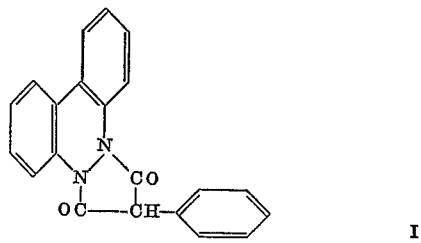

has therapeutically valuable properties. In particular it has an antipyretic, antiphlogistic and analgetic activity and is useful, above all, for the treatment of rheumatic diseases. It may be administered per os, by injection or in the form of suppositories. (The antiphlogistic activity, for example, may be evaluated by the action of the compound on erythema induced on the back of a non-narcotized guinea pig, according to G. Wilhelmi; cf. Schweiz med. Wschr., vol. 79, pages 577–582, and especially page 579 [1949].)

These new compounds can be produced by reacting a reactive functional derivative of phenyl malonic acid with 5.6-dihydro-benzo[c]cinnoline, or with an N-monoacyl derivative thereof having an acyl radical which is easily split off, the reaction being performed in the presence of a condensing agent or an acid binding agent; or the phenyl malonic acid can be reacted with a metal compound of the said dihydrobenzocinnoline. One method of performing the above process consists in condensing a phenyl malonic acid diester of the general formula:

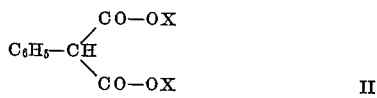

wherein X represents the radical of a hydroxyl compound, in particular a low alkyl radical, with 5.6-dihydro-benzo[c]cinnoline or with an N-monoacyl derivative thereof having an acyl radical which is easily split off, the condensation being performed preferably in the presence of an alkaline condensing agent; or a phenyl malonic acid derivative of the general formula:

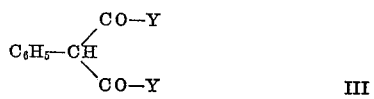

wherein Y represents chlorine, bromine or an acyloxy radical, is condensed with 5.6-dihydro-benzo[c]cinnoline of the general Formula III preferably in the presence of an acid binding agent, or with a metal compound of said dihydrobenzocinnoline.

Alkali metals or compounds thereof such as alcoholates, amides, or hydrides can be used as alkaline condensing agents in the first process above mentioned. The condensation is performed preferably in the presence of organic solvents such as, e.g. ethanol, butanol, benzene, toluene, xylene etc. and at a raised temperature, advantageously between 60 and 160° C., the alcohol which is liberated being continuously distilled off if desired.

In particular, tertiary organic bases such as pyridine or dimethyl aniline, triethyl and also tributyl amine in the presence or absence of additional organic solvents such as, e.g. diethyl or di-isopropyl ether or chloroform are suitable acid binding agents for the second reaction mentioned. In this case, the ring is closed already at low temperatures, advantageously in the region of 0° C. In particular the N.N'-disodium, N.N'-dipotassium and N.N'-dilithium compounds are used as metal compounds of the dihydrobenzocinnoline. Also the N.N'-bis- bromomagnesium compound for example can be used.

As reactive functional derivatives of phenyl malonic acid, also malonic acid monoester halides or malonic acid monoester anhydrides of the general formula:

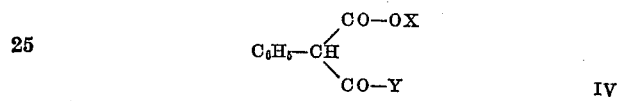

wherein X and Y have the meanings given above, can be used. These can be condensed in the cold in the presence of an acid binding agent with 5.6-dihydro-benzo[c]cinnoline according to the second process mentioned to form N-(α-carbalkoxy-acyl)-dihydrobenzocinnoline of the formula:

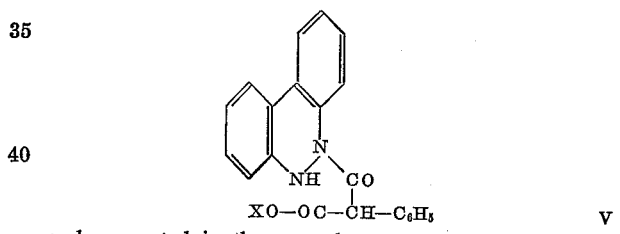

and converted in the second step corresponding to the first process mentioned by the action of alkaline condensing agents in the warm into the desired end product of the Formula I.

5.6-dihydro-benzo[c]cinnoline can be obtained for example by reduction of 2.2'-dinitro-diphenyl by means of sodium sulphide according to Ullmann and Dieterle, B. 37, 24, (1904), to form the benzo[c]cinnoline-5-oxide and reduction of the latter by means of zinc dust in alkaline solution according to Duval, B1. (4) 7, 487. The 2.2'-dinitro-diphenyl is obtained for example according to Niementowski, B. 34, 3327 (1901) from 2-nitro-benzene diazonium chloride by means of freshly precipitated copper. As the 5.6-dihydro-benzo[c]cinnoline is very quickly oxidised in the air into the benzo[c]cinnoline, it is advantageous to add it to the reaction mixtures in the form of its hydrochloride. The base is then liberated by an excess of alkaline condensing agent and the condensation is performed in a nitrogen atmosphere.

The new N.N'-(phenyl-malonyl)-dihydrobenzo[c]-cinnoline is a weakly colored, crystalline substance which dissolves easily both in the usual organic solvents as well as, due to the presence of an acid hydrogen atom, probably in the tautomeric enol form, in diluted aqueous alkalies. Also the new compound forms salts with other inorganic as well as with organic bases.

The aqueous solution of the alkali salts of the new compound has also the property of acting as solubility promoter on pyrazole derivatives.

The following example further illustrates the production of the new compound. Parts are given as parts by weight and their relationship to parts by volume is as that of grammes to cubic centimetres. The temperatures are in degrees centigrade.

*Example*

42 parts of phenyl-malonic-acid-diethylester (1.5 mol) are added to a sodium ethylate solution from 6.6 parts of sodium (2.5 mol) and 132 parts by volume of abs. ethanol, the air is replaced by nitrogen and then 25.2 parts of 5.6-dihydro-benzo[c] cinnoline hydrochloride (1 mol) are added. Half the alcohol is distilled off while stirring, 70 parts by volume of abs. xylene are added, distillation in a nitrogen atmosphere is continued for 12 hours, the oil bath temperature being kept between 140 and 145°.

After cooling, ice water is stirred in. When all the reaction products have dissolved, the layers are separated, the aqueous phase is shaken out twice with chloroform and made acid to Congo red paper with 6 N-hydrochloric acid. The separated oil is taken up in ether, the ethereal solution is washed with water, dried with anhydrous sodium sulphate and evaporated. The residue is recrystallised twice from benzene; N.N'-(phenyl-malonyl)-dihydrobenzo[c]cinnoline is obtained which melts at 210°.

What we claim is:

N.N'-(phenyl-malonyl)-dihydro-benzo[c]cinnoline.

References Cited in the file of this patent

UNITED STATES PATENTS 2,778,829     Matter _____ Jan. 22, 1957